United States Patent [19]
Watzke et al.

[11] Patent Number: 5,610,108
[45] Date of Patent: Mar. 11, 1997

[54] REDUCING MELT BOROSILICATE GLASS HAVING IMPROVED UV TRANSMISSION PROPERTIES AND WATER RESISTANCE AND METHODS OF USE

[75] Inventors: Eckhart Watzke; Thomas Kloss, both of Jena; Peter Brix, Mainz; Franz Ott, Mitterteich, all of Germany

[73] Assignee: Schott Glaswerke, Mainz, Germany

[21] Appl. No.: 319,969

[22] Filed: Oct. 7, 1994

[30] Foreign Application Priority Data

Oct. 15, 1993 [DE] Germany .................. 43 35 204.9

[51] Int. Cl.⁶ .................. C03C 3/091; C03C 4/08
[52] U.S. Cl. .................. 501/59; 501/66; 501/69; 501/70; 501/905
[58] Field of Search .................. 501/59, 66, 905, 501/69, 70

[56] References Cited

U.S. PATENT DOCUMENTS

| | | | |
|---|---|---|---|
| 1,623,301 | 4/1927 | Brenner | 501/59 |
| 2,382,056 | 8/1945 | Hood | 501/905 |
| 4,792,535 | 12/1988 | Fine | 501/95 |
| 4,855,260 | 8/1989 | Dumbaugh, Jr. et al. | |
| 4,925,814 | 5/1990 | Fine | 501/66 |
| 5,045,509 | 9/1991 | Kiefer et al. | 501/59 |
| 5,262,363 | 11/1993 | Yoshida et al. | 501/66 |
| 5,277,946 | 1/1994 | Nagai et al. | 501/66 |

FOREIGN PATENT DOCUMENTS

| | | |
|---|---|---|
| 0388581 | 9/1990 | European Pat. Off. . |
| 3826586 | 3/1989 | Germany . |
| 3801840 | 3/1989 | Germany . |
| 6077144 | 3/1983 | Japan . |
| 6021830 | 7/1983 | Japan . |
| 0021830 | 2/1985 | Japan . |
| 0077144 | 5/1985 | Japan . |
| 0215547 | 10/1985 | Japan . |
| 0200842 | 10/1985 | Japan . |
| 1201640 | 9/1986 | Japan . |
| 4-342437 | 11/1992 | Japan . |

OTHER PUBLICATIONS

Volf, *Chemical Approach to Glass*, 1984 pp. 347–359.

Primary Examiner—Mark L. Bell
Assistant Examiner—David Sample
Attorney, Agent, or Firm—Michael J. Striker

[57] ABSTRACT

Reducing melt borosilicate glass having a UV transmittance of at least 85% for ultraviolet radiation having a wavelength of 254 nm for a sample thickness of 1 mm and a water-resistance of less than 100 micrograms, advantageously less than 62 micrograms, $Na_2O$ per gram of glass powder according to ISO 719 and a thermal expansion coefficient $\alpha_{20/300}$ of from 5 to $6 \times 10^{-6} K^{-1}$ and comprising from 58 to 65% by weight $SiO_2$, from 18 to 20.5% by weight $B_2O_3$, from 8.1 to 10.4% by weight $Al_2O_3$, from 0 to 1% by weight CaO, from 0 to 2% by weight BaO, from 0 to 2% by weight SrO, from 0 to 1.5% by weight $Li_2O$, from 5.5 to 8.5% by weight $Na_2O$, from 0 to 3% by weight $K_2O$ and from 0 to 2% by weight fluorine. The sum total content of all of the alkali metal oxides present in the glass is not greater than 10% and the sum total content of the CaO, BaO and SrO is not greater than 3% and the molar ratio of $Al_2O_3$: $Na_2O$ is from 0.6 to 1. The glass is particularly suitable for EPROM windows, UV lamps, photomultipliers, spectrophotometers under difficult climatic conditions and protective tubes for UV lamps immersed in water in waste water treatment operations.

6 Claims, No Drawings

REDUCING MELT BOROSILICATE GLASS HAVING IMPROVED UV TRANSMISSION PROPERTIES AND WATER RESISTANCE AND METHODS OF USE

BACKGROUND OF THE INVENTION

The present invention relates to a reducing melt borosilicate glass which transmits comparatively more UV radiation and has improved water-resistance properties.

Glass with comparatively high UV transmission properties has numerous applications, e.g. in EPROM windows and in UV glasses, in photomultiplier windows and windows of spectrometer as well as in a protective tube of a UV lamp in a UV reactor. For example, polluted water or chemical process waste water is prepared for further processing, given germicidal treatments and/or disposed of in UV reactors with the assistance of UV radiation, particularly at 254 nm wavelength. A UV radiation protective glass tube and also an EPROM glass thus must have the highest possible UV transmittance and also at the short UV wavelengths such as 254 nm. Furthermore they must have good water-resistance, since they are exposed to the action of aqueous solutions over a very long time and eventually at elevated temperatures. Quartz glass is especially suitable in itself as a UV transmitting glass, however because of its comparatively high price and difficult workability it is Used only in those exceptional cases in which particularly good hydrolytic properties are required. A further disadvantage of quartz is that it is only poorly fusible with ceramic substrates (e.g. $Al_2O_3$), Ni-Fe-Co alloy or with molybdenum because of the too low thermal expansion coefficients.

UV-transmitting glasses have already been developed, which however only partially fulfill the requirements for UV transmittance and water-resistance or hydrolytic properties. Borosilicate glasses are particularly useful as UV-transmitting glasses.

Japanese Patent Application 60-77 144 describes a glass with a composition (in % by weight on an oxide basis) of 56 to 70% $SiO_2$, 16 to 35% $B_2O_3$, 4.7 to 13% $Na_2O$ and 3 to 7% $Al_2O_3$, which has a thermal expansion coefficient of 3.8 to $5.8 \times 10^{-6}$ $K^{-1}$ in a temperature range of from 20° C. to 300° C.

Japanese Patent Application 60-21 830 describes a borosilicate glass with a composition (in % by weight) of 60 to 70% $SiO_2$, 4 to 8% $Al_2O_3$, 18 to 25% $B_2O_3$, 6 to 11% $Li_2O+Na_2O+K_2O$, 0 to 4% alkaline earth oxides and zinc oxide, and 0 to 3% fluorine. This glass has a thermal expansion coefficient of 5.0 to $5.8 \times 10^{-6}$ $K^{-1}$ in a temperature range of from 20° C. to 300° C.

Another UV-transmitting glass that provides comparatively high transmission of UV radiation is described in German Patent Application DE-OS 38 26 586. This glass has a composition (in % by weight) of 58 to 62% $SiO_2$, 15 to 18% $B_2O_3$, 11.4 to 14.5% $Al_2O_3$, 1 to 2.5% $Li_2O$, 5.5 to 6.5% $Na_2O$, 0 to 2% $K_2O$ and 0 to 0.6% chlorine. The thermal expansion coefficient $\alpha$ of this glass is from 5.6 to $6.2 \times 10^{-6}$ $K^{-1}$ in a temperature range of from 0° C. to 300° C.

Another glass of similar composition is described in European Patent Application Nr.0 388 581. This glass has the following composition in Mol % of 60 to 70% $SiO_2$, 16 to 20% $B_2O_3$, 1 to 8% $Al_2O_3$, 2.5 to 5% $Na_2O$, 0 to 3% $K_2O$ and 1 to 6% $Li_2O$. The thermal expansion coefficient $\alpha$ of this glass is from 4.6 to $5.2 \times 10^{-6}$ $K^{-1}$ in a temperature range of from 0° C. to 300° C.

There is also a commercially available glass with the designation "8338" with the approximate composition in weight percent of 62% $SiO_2$, 19.8% $B_2O_3$, 6.5% $Al_2O_3$, 7.4% $Na_2O$, 1.7% $K_2O$, 0.5% CaO, 1.4% BaO and 0.7% Fluorine with a thermal expansion coefficient $\alpha_{20/300}$ of $5.5 \times 10^{-6}$ $K^{-1}$.

There is also a glass known with the designation "BU 54" with the approximate composition in weight percent of 64.8% $SiO_2$, 20.2% $B_2O_3$, 6.5% $Al_2O_3$, 6.5% $Na_2O$, 1.8% $K_2O$ and 0.1% chlorine. This glass with a water resistance according to ISO 719 of about 250 micrograms per gram glass power is however not suitable for many applications, e.g. in the tropics.

According to the current state of the art it is generally known that to make this kind of glass only trace amounts of UV-absorbing materials may be contained in it so that a high UV transmittance can be obtained. Particularly contamination by the $Fe^{+3}$ cation is to be avoided. Iron compounds are present in many raw materials used in glass making as impurities. Since absolutely iron-free materials are too expensive, the presence of some iron compounds cannot be avoided because of costs. Generally one uses high purity materials in the art of UV-transmitting glasses so that the content of iron compounds in the finished glass is not more than 10 ppm iron oxide. Since particularly the iron (III) cation is a strong absorber of UV radiation, the iron (III) cation must be reduced to the nonabsorbing iron(II) cation in UV applications. This happens by using a suitable reducing agent, e.g. sugar, and is assisted, as needed, by melting under a nonoxidizing atmosphere, as described in EP 0 388 581 A, to prevent reoxidation of $Fe^{+2}$ to $Fe^{+3}$.

Melts made too strongly reducing can lead to formation of defect centers and, because of that, to unintended absorption in the visible spectrum with transmission loses into the UV range, or even to UV absorption, which naturally makes the glass unusable. In melts with reduction potentials which are too low in contrast the iron (III) cations are not reduced sufficiently to iron (II) cations, so that the remaining iron (III) cations do not allow the maximum possible UV transmission. As a result the redox potential of the melt must be adjusted and maintained according to the specific requirements of the individual application. Frequently however on melting or fusing already small fluctuations of the redox potential can lead to considerable fluctuations in the UV-transmission properties. This phenomenon has been characterized as an insufficient stability of the high UV transmittance of the glass. The highest stability for desired reduced valence of the polyvalent ions required for high UV transmittance (particularly $Fe^{+2}$) is achieved in glasses with an optimumized glass structure of higher binding strength. The known glasses because of their nonoptimized glass structure have achieved only an insufficient stability of high UV transmittance.

Furthermore many of the known high UV transmitting glasses have water resistance values of >100 micrograms $Na_2O$ per gram of glass powder which is insufficient for use, e.g. as EPROM windows, in countries having a highly humid environment. For use in protective tubes in UV reactors the known glasses are generally inadequate, since this application requires a particular high water resistance of under 100 micrograms $Na_2O$ per gram of glass powder. Multicomponent glasses, which can be used for this purpose and are very water-resistant are not known, but very expensive quartz materials can be used.

SUMMARY OF THE INVENTION

It is an object of the present invention to provide an improved borosilicate glass which has a high UV transmittance of at least 85% at wavelengths of 254 nm with a sample layer thickness of 1 mm, which has a good to very good water resistance of less than 100 microgram $Na_2O$ per gram of glass powder according to ISO 719, a linear thermal expansion coefficient $\alpha_{20/300}$ of 5 to $6 \times 10^{-6}$ $K^{-1}$ and which can be melted in a stable manner regarding its UV transmission properties.

Surprisingly it was found that it is possible without additional expense and in a simple way to decisively improve the UV transmittance and the water-resistance in the well studied borosilicate glass system $M_2O$ —MO— $Al_2O_3$—$B_2O_3$—$SiO_2$ by optimizing the borate structure of the glass. Experiments in glasses of the above-named system has shown that they have differences in UV transmission because of structural differences. In borosilicate glasses $BO_{3-}$ and $BO_{4-}$ anions have been shown to be present as reported by RAMAN spectroscopy. It was found that a definite proportion of from 8.1 to 10.4% by weight $Al_2O_3$ in combination with a preponderant proportion of $Na_2O$ in glasses having a composition in weight % of 58 to 65% $SiO_2$, 18 to 20.5% $B_2O_3$, 0 to 1.5% $Li_2O$, 5.5 to 8.5% $Na_2O$, 0 to 3% $K_2O$, 0 to 1% CaO, 0 to 2% BaO, 0 to 2% SrO and 0 to 2% fluorine caused a qualitative shift in the glass structure toward higher boroxo proportions. A sharp increase in the UV transmission of the glass occurs with increasing $B_2O_6$ structure components and simultaneous reduction in $BO_4$-×2 $BO_3$-structure components in the glass structure.

Also it was found that glass with comparatively high boroxo ring content in the borate structure tended to form less defect centers and thus had a comparatively high UV transmission stability on melting. Since the troublesome iron (III) charge-transfer transition is caused predominantly by $Fe^{+3}(O_4)$ structural elements, interconnected with $BO_{4-}$ tetrahedron, and because of the optimization of the glass composition in the direction of the dominant boroxo ring structure, the iron (III) charge-transfer extinction band has a reduced intensity and has a shortwave maximum in the UV-C-region. Residual absorption by incompletely reduced iron (III) is thus less severe in these glasses.

At the same time it was found that a reduction in the basicity of the glass by increasing the boroxo ring structural elements allows a more effective reduction of the iron (III).

It was also found that the water-resistance of the glass compositions according to the invention could be adjusted to values of less than 100 micrograms $Na_2O$ per glass powder to the very good water-resistance of less than 20 micrograms $Na_2O$ per glass powder according to the molar ratio of $Al_2O_3$ to $Na_2O$. If the $Al_2O_3$ content is 8.1 to 10.4% by weight and the ratio of $Al_2O_3$ to $Na_2O$ (in Mol %) is from 0.6 to 1.0, the high UV-transmittance and good to very good water-resistance can be obtained.

So that it has a high UV transmission the glass must have a highly interlinked or crosslinked structure so that acid, i.e. alkaline- and alkaline earth-poor, glasses are the result. The addition of alkaline earth and alkali metal oxides breaks up the glass structure by increasing the proportion of nonbridge bond forming oxygen, so that the UV absorption limit is shifted to the long wave region. At the same time the water-resistance becomes poorer, particularly with increases in the alkali metal oxide content of the glass.

However because of the need for meltability, workability and the fusibility with for example $Al_2O_3$-substrates, Ni-Fe-Co alloys or molybdenum, the glass must have a certain, not to be eliminated, portion of alkali metal and alkaline earth metal oxides. $Li_2O$ should be present in the glass in an amount which is at most equal to 1.5% by weight, particularly only up to 0.5% by weight. When this value is exceeded, the mixture is too expensive. $K_2O$ is present in the glass in amounts of from 0 to 3% by weight, particularly of 1 to 2% by weight; while a larger portion leads to a thermal expansion coefficient which is too large, a lesser portion to poor fusion properties. Especially an $Na_2O$ content of from 5.5 to 8.5 by weight is essential. When the $Na_2O$ content is reduced so that the ratio of $Al_2O_3:Na_2O$ (in mol %) is too large, the glass is difficult to melt; at a comparatively higher $Na_2O$ content the ratio of $Al_2O_3:Na_2O$ (in mol %) is too small and thus the water-resistance is reduced. The proportion of alkali metal oxides should however not exceed 10% by weight. If the portion of alkali metal oxides exceeds 10% by weight, the thermal expansion coefficient is too large.

The alkaline earth metal oxides CaO, SrO and BaO act as flux material and adjust the thermal expansion properties of the glass. The alkaline earth metal oxide content should be kept as small as possible because otherwise the UV-transmission of the glasses is reduced.

The content of CaO should be 1% by weight, the content of SrO should be 2% by weight and the content of BaO should also be 2% by weight. These values should not be exceeded in as much as the total amount of alkaline earth metal oxides of calcium, barium and strontium should not exceed 3% by weight.

Aluminum oxide is contained in the glass in an amount of from 8.1 to 10.4% by weight. If an amount of aluminum oxide present is less than 8.1% by weight, the UV structure effect does not occur. Above an amount of 10.4% by weight the UV structure effect is not further augmented. However the high viscosity and thus the melting temperature are made drastically poorer.

$B_2O_3$ is contained in the glass in an amount of from 18 to 20.5% by weight. If the glass contains $B_2O_3$ in amounts outside this range, the UV structure effect is not caused and/or the resistance of the glass to chemical attack is poorer.

The proportion of $SiO_2$ in the glass is between 58 and 65% by weight, because the desired thermal expansion and melt viscosity is attained when the $SiO_2$ content lies in this range. The glass can also contain fluoride ion in amounts up to 2% by weight, and the fluoride ion acts as a flux material and/or a melt forming catalyst.

The glass should have a maximum content of iron oxides of less than 10 ppm as impurities and the content of iron (III) oxide should be under 2 ppm.

The glass has outstanding physical properties, namely a transmission of at least 85% at wavelengths of 254 nm and layer thicknesses of 1 mm and a water-resistance of under 100 micrograms $Na_2O$ per g of glass powder according to ISO 719 and a thermal expansion coefficient $\alpha_{20/300}$ of 5 to $6 \times 10^{-6}$ $K^{-1}$. Furthermore the water-resistance is generally less than 62 micrograms $Na_2O$ per g glass powder which corresponds to a hydrolytic class of 2 or better. This glass is therefore particularly suitable for use as a high transmission UV-transmitting glass material, especially in EPROM windows, UV lamps, photomultipliers, spectrometers and the like, particularly when they must be used under severe climatic conditions or also as protective tubes for UV lamps, which are used in UV oxidation reactors for treatment of polluted water, for which the current glass materials are not suitable because of reduced hydrolytic resistance or water-resistance.

The glass is melted using conventional, but particularly iron poor (in regard to $Fe^{+3}$), glass raw material in a manner known in itself. The mixture must not contain species which oxidize $Fe^{+2}$ and UV absorbing species such a nitrate, $As_2O_3$, $Sb_2O_3$, $CeO_2$, $TiO_2$ and so forth The content of iron impurities in the glass must not exceed 10 ppm, calculated as iron oxide.

As the need requires, the melt can be mixed with non-oxidizing refining agents such as alkali metal and/or alkaline earth metal chlorides, especially advantageously with NaCl. Any reducing agent can be used as the reducing agent for iron (III). Advantageously carbon-containing reducing agents are particularly advantageous because of their milder action. Of the carbon-containing reducing agents sugar is particularly suitable with the melts in nonoxidizing or only weakly oxidizing atmosphere.

EXAMPLES

Different glasses made from common glass raw materials were melted in a quartz vessel at temperatures of from 1580° to 1630° C. About 0.2% by weight carbon was used in the form of sugar as a reducing agent. The glasses were refined or purified with NaCl and homogenized. The impurities from the raw materials used in the glass amounted to less than 2 ppm calculated as iron (III) oxide.

The composition (in percent by weight based on oxides) of the melted glasses, and their physical and chemical properties are summarized in the following Table I. The composition and properties of the synthesized glass (in Mol %) are summarized in Table II).

TABLE I

| | GLASS MELT COMPOSITION (in % by weight on an oxide basis) | | | | | | | | |
|---|---|---|---|---|---|---|---|---|---|
| Example | 1 | 2 | 3 | 4 | 5 | 6 | 7 | 8 | 9 |
| $SiO_2$ | 60.9 | 62.6 | 59.3 | 60.8 | 61.9 | 62.7 | 61.6 | 62.3 | 62.1 |
| $B_2O_3$ | 18.9 | 18.9 | 19.6 | 19.5 | 19.9 | 19.9 | 18.9 | 19.8 | 19.8 |
| $Al_2O_3$ | 9.7 | 9.4 | 9.5 | 9.4 | 8.2 | 8.2 | 10.4 | 8.2 | 8.1 |
| $Li_2O$ | — | — | — | — | — | — | — | 0.5 | — |
| $Na_2O$ | 6.4 | 7.0 | 7.3 | 7.9 | 6.7 | 6.9 | 7.0 | 6.9 | 6.7 |
| $K_2O$ | 1.6 | 1.6 | 1.7 | 1.7 | 1.7 | 1.7 | 1.6 | 1.7 | 1.7 |
| CaO | 0.6 | — | 0.5 | — | 0.3 | — | — | — | — |
| SrO | — | — | — | — | — | — | — | — | — |
| BaO | 1.4 | — | 1.4 | — | 0.7 | — | — | — | — |
| F | 0.5 | 0.5 | 0.7 | 0.7 | 0.6 | 0.6 | 0.5 | 0.6 | 1.6 |
| Mol % $Al_2O_3$/Mol. % $Na_2O$ | 0.91 | 0.82 | 0.79 | 0.72 | 0.73 | 0.72 | 0.92 | 0.72 | 0.75 |
| τ (%)* | 89 | 88 | 87 | 88 | 88 | 87 | | | |
| H**) | 22 | 31 | 47 | 53 | 48 | 53 | | | |
| α 20/300 $10^{-6} \times K^{-1}$ | 5.7 | 5.7 | 5.6 | 5.7 | 5.3 | 5.3 | | | |
| ρ (gxcm$^{-3}$) | 2.25 | 2.22 | 2.24 | 2.22 | 2.25 | 2.23 | | | |

The reducing agent—0.2% by weight carbon.
*)Transmission at 254 nm and 1 mm layer thickenss
**)Water-resistance according to ISO 719 in micrograms $Na_2O$/g Glass powder

TABLE II

| | SYNTHETIC GLASS (in mol-%) | | | | | | | | |
|---|---|---|---|---|---|---|---|---|---|
| Example | 1 | 2 | 3 | 4 | 5 | 6 | 7 | 8 | 9 |
| $SiO_2$ | 65.5 | 66.6 | 63.5 | 64.5 | 65.7 | 66.3 | 65.8 | 65.4 | 64.2 |
| $B_2O_3$ | 17.4 | 17.3 | 18.0 | 17.9 | 18.1 | 18.1 | 17.4 | 17.9 | 17.6 |
| $Al_2O_3$ | 6.1 | 5.9 | 6.0 | 5.8 | 5.1 | 5.1 | 6.6 | 5.1 | 5.0 |
| $Li_2O$ | — | — | — | — | — | — | — | 1.1 | — |
| $Na_2O$ | 6.5 | 7.0 | 7.4 | 7.9 | 6.6 | 6.8 | 7.0 | 6.7 | 6.5 |
| $K_2O$ | 1.1 | 1.1 | 1.1 | 1.2 | 1.2 | 1.1 | 1.1 | 1.1 | 1.1 |
| CaO | 0.7 | — | 0.6 | — | 0.3 | — | — | — | — |
| BaO | 0.6 | — | 0.6 | — | 0.3 | — | — | — | — |
| NaCl | 0.4 | 0.4 | 0.4 | 0.4 | 0.7 | 0.6 | 0.4 | 0.7 | 0.4 |
| F | 1.7 | 1.7 | 2.4 | 2.3 | 2.0 | 2.0 | 1.7 | 2.0 | 5.2 |
| $Al_2O_3$: $Na_2O$ (incl. $Na_2O$ from NaCl) | 0.91 | 0.82 | 0.79 | 0.72 | 0.73 | 0.72 | 0.92 | 0.72 | 0.75 |

While the invention has been illustrated and embodied in a reducing melt borosilicate glass having improved UV transmission properties and water-resistance and methods of use thereof, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art,fairly constitute essential characteristics of the generic or specific aspects of this invention.

What is claimed is new and desired to be protected by Letters Patent is set forth in the appended claims.

We claim:

1. A borosilicate glass made by melting under reducing conditions and having a UV transmittance of at least 85% for ultraviolet radiation having a wavelength of 254 nm for a layer thickness of 1 mm of said glass, a water-resistance of less than 100 micrograms $Na_2O$ per gram of glass powder according to ISO 719 and a thermal expansion coefficient $\alpha_{20/300}$ of from 5 to $6 \times 10^{-6} K^{-1}$ and comprising from 58 to 65% by weight $SiO_2$, from 18 to 20.5% by weight $B_2O_3$, from 8.1 to 10.4% by weight $Al_2O_3$, from 0 to 1% by weight CaO, from 0 to 2% by weight BaO, from 0 to 2% by weight SrO, from 0 to 1.5% by weight $Li_2O$, from 5.5 to 8.5% by weight $Na_2O$, from 0 to 3% by weight $K_2O$, from 0 to 2% by weight fluorine, up to 10 ppm of iron oxides including iron (III) oxide and a sufficient amount of a reducing agent to maintain the iron (III) oxide concentration less than 2 ppm, and wherein a sum total content of all of alkali metal oxides present including said $Li_2O$, said $Na_2O$ and said $K_2O$ is not-greater than 10%, a sum total content of said CaO, said BaO and said SrO is not greater than 3% all values of said % by weight are on an oxide basis and a molar ratio of $Al_2O_3:Na_2O$ is from 0.6 to 1.

2. The borosilicate glass as defined in claim 1, wherein said reducing agent is a carbon-containing reducing agent.

3. The borosilicate glass as defined in claim 3, wherein said carbon-containing reducing agent is sugar.

4. A borosilicate glass made by melting under reducing conditions and having a UV transmittance of at least 85% for ultraviolet radiation having a wavelength of 254 nm for a layer thickness of 1 mm of said glass, a water-resistance of less than 100 micrograms $Na_2O$ per gram of glass powder according to ISO 719 and a thermal expansion coefficient $\alpha_{20/300}$ of from 5 to $6 \times 10^{-6} K^{-1}$ and comprising from 58 to 65% by weight of said $SiO_2$, from 18 to 20.5% by weight of said $B_2O_3$, from 8.1 to 10.4% by weight of said $Al_2O_3$, from 0 to 1% by weight of said CaO, from 0 to 2% by weight of said BaO, from 0 to 2% by weight of said SrO, from 0 to 0.5% by weight of said $Li_2O$, from 5.5 to 8.5% by weight of said $Na_2O$, from 1.0 to 2.0% by weight of said $K_2O$, from 0 to 2% by weight of said fluorine, up to 10 ppm of iron oxides including iron (III) oxide and a sufficient amount of a reducing agent to maintain the iron (III)oxide concentration less than 2 ppm, and wherein a sum total content of said alkali metal oxides present including-said $Li_2O$, said $Na_2O$ and said $K_2O$ is not greater than 10%, a sum total of said CaO, said BaO and said SrO is not greater than 3% and all values of said % by weight are on an oxide basis.

5. The borosilicate glass as defined in claim 4, wherein said reducing agent is a carbon-containing reducing agent.

6. The borosilicate glass as defined in claim 5, wherein said carbon-containing reducing agent is sugar.

* * * * *